(12) United States Patent
Papadimitriou et al.

(10) Patent No.: US 6,385,458 B1
(45) Date of Patent: May 7, 2002

(54) PRIORITY HANDLING OF LOCATION SERVICES IN A MOBILE COMMUNICATIONS NETWORK

(75) Inventors: Dimitrios Papadimitriou, Dallas; Theodore Havinis, Richardson, both of TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/458,594

(22) Filed: Dec. 10, 1999

(51) Int. Cl.7 ................................................ H04Q 7/20
(52) U.S. Cl. ..................... 455/456; 455/435; 455/436; 455/512; 455/527; 455/440; 455/432
(58) Field of Search ................................ 455/456, 435, 455/422, 432, 436, 440, 466, 512, 527; 701/207

(56) References Cited

U.S. PATENT DOCUMENTS

| | | | | |
|---|---|---|---|---|
| 5,960,341 A | * | 9/1999 | Leblanc et al. ............. | 455/426 |
| 5,963,866 A | * | 10/1999 | Palamara et al. ........... | 455/456 |
| 6,002,936 A | * | 12/1999 | Roel-Ng et al. ............ | 455/456 |
| 6,064,885 A | * | 5/2000 | Rouhollahzadeh et al. . | 455/439 |
| 6,067,457 A | * | 5/2000 | Erickson et al. ............ | 455/512 |
| 6,078,818 A | * | 6/2000 | Kingdon et al. ............ | 455/456 |
| 6,104,932 A | * | 8/2000 | Havinis ...................... | 455/456 |
| 6,112,101 A | * | 8/2000 | Bhatia et al. ............... | 455/512 |
| 6,184,829 B1 | * | 2/2001 | Stilp .......................... | 342/387 |

* cited by examiner

*Primary Examiner*—Edward F. Urban
*Assistant Examiner*—Marceau Milord
(74) *Attorney, Agent, or Firm*—Arthur I. Navarro

(57) ABSTRACT

Provided is a method, computer program, and system that implements a location service in a mobile communications network to generate a location estimate for a terminal device associated with a user. The method takes a location request, and, with a precision that is dependent on an assigned priority level, estimates the location of a mobile phone. The computer program implements the method in software with modular programming. The system achieves the present invention by applying a location services algorithm to a mobile communications network.

20 Claims, 2 Drawing Sheets

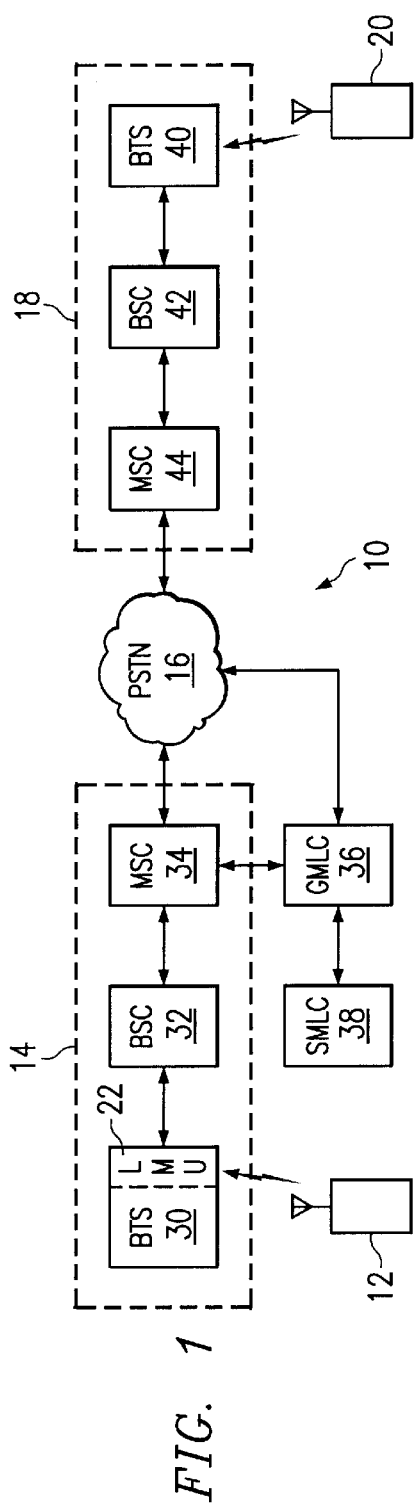
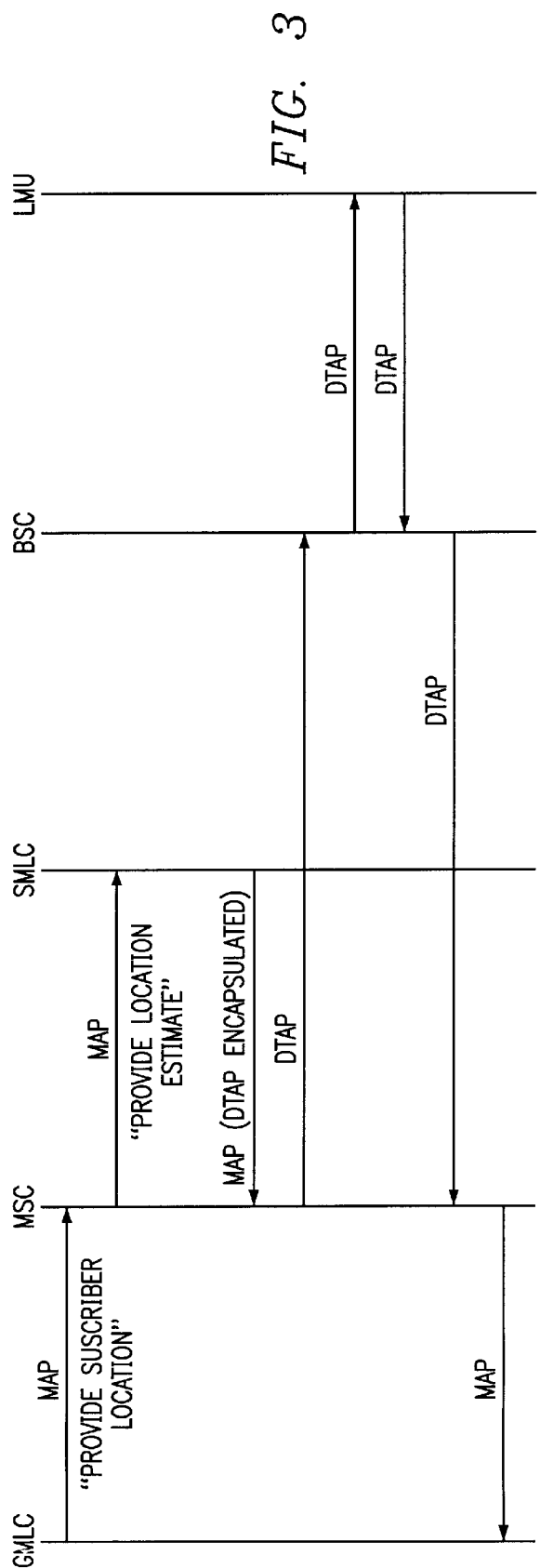

PRIORITY HANDLING OF LOCATION SERVICES IN A MOBILE COMMUNICATIONS NETWORK

TECHNICAL FIELD

The present invention generally relates to mobile communication networks, including cellular-type wireless networks, and, more particularly to a method and computer program for assigning and managing priority for location services in a mobile communication network.

BACKGROUND OF THE INVENTION

Mobile Communications Networks

FIG. 1 (Prior Art) illustrates a block diagram of a mobile communications network 10 comprising a terminal device, illustrated as an originating mobile phone 12, coupled by an RF communication link to an originating network 14. The terminal device is preferably a mobile phone 12, but could be any wireless communication device such as a pager, a Personal Digital Assistant (PDA), or a Mobile Computing Device (MCD), for example, but may also be a fixed wireless device. The mobile phone 12 may operate based on any number of communication standards including AMPS, TDMA, D-AMPS, GSM, IS-95, or third generation (3G) protocols, for example.

The originating network 14 is seen to be coupled to a transit network or communication link 16, which may comprise a public switched telephone network (PSTN), but could also comprise of other networks including an Internet Protocol (IP) core network, an Asynchronous Transfer Mode (ATM) core network, or an optical network, for example. The transit network 16 interfaces and communicates electrical signals including digitized voice calls between the originating network 14 and a destination network 18. Destination network 18 may be the same as, or different than, the originating network 14, and thus may comprise AMPS, D-AMPS, TDMA, GSM IS-95, or 3G networks such as UMTS. Terminating network 18 is coupled to and services, via a Radio Frequency (RF) link, a destination terminal device, shown to be a mobile phone 20.

The originating network 14 is seen to include a base transceiver station (BTS) 30 serving via a radio frequency (RF) link the originating mobile phone 12. Each BTS 30 services multiple mobile phones 12, although only one is shown for purposes of illustration and clarity. Each BTS 30 also includes a Location Measurement Unit (LMU) 22 (the LMU 22 may also be physically located outside of the BTS 30).

The LMU 22 measures the distance between the mobile phone 12 and the LMU 22 and reports the distance to a Base Station Controller (BSC) 32. Accordingly, originating network 14 further includes a BSC 32 and a Mobile Switching Center (MSC) 34, which can communicate with each other via Direct Transfer Application Part (DTAP) messaging. The network 14 is connected through the MSC 34 to a Gateway Mobile Location Center (GMLC) 36, and communicates with Mobile Application Part (MAP) messaging protocol. The GMLC 36 provides the hardware connections needed to interface the network 14 with the transfer network 16, and houses selected processing functions as well. In addition, the GMLC 36 interfaces to users of a location service that is seeking the location of a mobile phone or other terminal device, performs user authorization tasks, and also forwards positioning requests to the mobile phone's current mobile network.

Likewise, the GMLC 36 communicates with a Serving Mobile Location Center (SMLC) 38 via Mobile Application Part (MAP) messaging. The SMLC 38 provides the network resources needed to process calls in the network, and particularly to locate a mobile phone, and is directly associated with the MSC communicating with a mobile station that is being located. More particularly, the primary task of the SMLC 38 is to decide upon a positioning method to use to estimate the location of a mobile phone (various methods are discussed below). Note that the BTS 30 and BSC 32 are sometimes collectively referred to as a Base Station Subsystem (BSS).

The BSC 32 interfaces voice calls between multiple BTSs 30 and MSC 34, wherein BSC 32 typically serves multiple BTSs 30, and, similarly, MSC 34 services multiple BSCs 32. MSC 34 includes a visitor location register (VLR) which includes and stores various information regarding the mobile phones 12 currently being served by the originating network 14.

The destination network 18 includes a BTS 40 serving the destination mobile phone 20, as well as a BSC 42 and an MSC 44. Destination network 18 may operate according to the same or a different operating protocol as originating network 14. MSCs 34, 44 each include a VLR for maintaining a register of information for all mobile phones 20 currently being served by the destination network 18. Thus, the MSCs may also be referred to as MSC/VLRs.

Transit network 16 is preferably a PSTN. Originating MSC 34 and terminating MSC 44 exchange digitized voice data over the transit network 16, in preferably an encoded Pulse Code Modulation (PCM) format, transmitted at about 64 kbps. Although PCM is a preferred encoding format, other encoding formats are available. Generally, the digitized voice data transferred over transit network 16 can be in any format which is compatible and supported by both the originating network 14 and the destination network 18.

Locating a Mobile Phone

There are many reasons why one would want to locate a mobile phone (such as a mobile phone or a pager, for example). For example, investigative agencies, such as the Federal Bureau of Investigation (FBI) and the National Security Agency (NSA) have an interest in locating persons for the purposes of law enforcement and surveillance. Likewise, private companies and individuals often need location data. For example, a Taxi company may wish to monitor the location of its cabs, or to provide them instant access to directions. Likewise, a parent may wish to know the location of a son or daughter who may be out on a date.

One service that needs location information and is highly desired by mobile phone users is the ability to use an emergency number, such as 911. Mobile phone users want to not only quickly connect to emergency services, but also have the ability to request police or other emergency assistance to their specific location (especially when the user's location is unknown to the user). Accordingly, emergency number and location services are now in place in progressive mobile networks. Governments also have an interest in insuring that emergency services can find the caller of the emergency number.

To accelerate the rate at which mobile networks incorporate emergency numbers in their systems, in the United States the Federal Communications Commission (FCC) has recently promulgated requirements relating to emergency numbers in mobile networks. Among these requirements is that the mobile network provider be able to locate a cell phone within about ten meters of the mobile phone's true location, when an emergency number is dialed, about 67% of the time. Other governments are implementing similar rules. To comply with these government mandates, cellular telephone service providers utilize a number of methods to locate cell phones.

Some methods of calculating the location of a mobile phone measure the time it takes for a signal to travel between a predetermined number of points in the mobile network. One method of locating a cell phone using time measurements is called the Uplink Time of Arrival (TOA) method.

The Uplink Time of Arrival method is based on measuring the time of arrival of a known signal sent from a mobile phone and received by at least three different base stations. The TOAs at different base stations are calculated and transmitted to a Mobile Positioning Center (MPC). Because of the unknown transmission time of the mobile, the MPC calculates time-difference-of-arrivals (TDOA) by pair-wise subtracting the TOA values. The mobile position can then be calculated via hyperbolic trilateration.

Handover Timing Advance (HTA) provides another method of using timing advance to locate a mobile phone. In a Time Division Multiple Access (TDMA) system the time it takes a signal to travel between the mobile phone and the serving base station must be known to avoid overlapping time slots. This time delay is called Timing Advance (TA) in the Global System for Mobile Communications (GSM). The TA can be applied to mobile positioning using a A Forced Handover method. First, at a positioning request, the network will force the MS to make a handover attempt from the serving base station to one of the neighbor cells. Then, the selected neighbor cell will measure the TA and then reject the handover request. The mobile phone will inform the serving base station about the rejection which will try another handover to another base station. This can be continued until a sufficient number of TA measurements are done by neighboring base stations. Finally, the mobile phone's position can then be calculated from at least three TA measurements via circular trilateration.

Observed Time Difference (OTD) uses the measured timing difference of received signals to calculate the location of a mobile phone. In order create a time measurement, the mobile phone supports a "pseudo-synchronous handover," whereby the mobile phone keeps track of the time it takes for signals to travel to and from neighboring base stations. The OTD then denotes the timing difference between the serving base station and neighboring base stations. With the OTDs measured to at least two neighboring base stations, the mobile phone's position can be calculated via hyperbolic trilateration. OTD is typically executed in the mobile phone.

Another method of locating a mobile phone uses the Global Positioning System (GPS). To use GPS, a GPS receiver is located in a cell phone. The GPS receiver receives time information transmitted from satellites in orbit around the earth. The time information is received by the GPS receiver, and is then used by the GPS receiver to calculate the approximate position of the mobile phone. Then, when the cellular telephone dials an emergency number, the location of the cell phone is transmitted on the uplink channel.

Location beacons provide yet another method of identifying the location of a mobile phone. In a mobile network that uses beacons to assist in the locating of a cellular telephone, beacons are placed throughout the mobile network. For example, beacons may be placed on telephone poles, traffic lights, atop beacon towers, along buildings or other selected locations. Each beacon transmits a unique signal which identifies that beacon. Accordingly, in a beacon based location system, when an emergency number is dialed, the mobile phone transmits data containing unique beacon identification signals received by the mobile phone, as well as other information that can be used to locate the mobile phone, such as signal strengths. Afterwards, algorithms are used to calculate the location of the mobile phone.

Location Services

The service that locates the mobile phone is called a location service (LCS). Using the Taxi example from above, one commercial application provides the Taxi operator access to location information. These services may be location dependent as well. For example, the service may operate when a Taxi is in one geographic location, but not when it is in another location. Similar location dependent exclusions apply to other services as well. LCS is a new and emerging technology that is expanding rapidly in availability and scope, and as cellular networks become overloaded with LCS and other new services, the resources available to offer location services become scarce.

Besides commercial applications, LCS provide the vital service of locating a user who is at emergency. As discussed previously, the FCC places many demands on cellular systems regarding the locating of a user who is initiates an emergency service. It is therefore important that a mobile communications network be capable of coping with FCC requirements—in other words, it is important to make sure that a LCS service can successfully compete for system resources versus other services, and against other non-emergency LCS requests. Unfortunately, no such methods are known. Therefore, there exist the need for methods of negotiating LCS requests for mobile communications network resources against the competing requests of other services, including other LCS services.

SUMMARY OF THE INVENTION

The present invention achieves technical advantages as a method, computer program and system that provides a location service in a mobile communications network to provide a location estimate for a terminal device associated with a user. The method takes a location request, and, with a precision that is dependent on an assigned priority level, estimates the location of a mobile phone. The computer program implements the method in software with modular programming, and the system achieves the present invention by applying a location services algorithm to a mobile communications network. Accordingly, the present invention allows flexibility in using and allocating mobile communication network resources to finding the location of mobile phones, provides additional sources of revenue for mobile communication network operators, and provides a correspondence to existing methods of handling non-location priority services, such as eMLPP.

In one embodiment, the present invention is a mobile location service that estimates the location of a mobile phone with an accuracy based on a subscriber priority. The method begins when a location request is received. Next, the user is associated with a priority level (which may be a subscribed priority level or a selected priority level) and the location request is processed to determine a location estimate for the terminal device. The precision of the location estimate is based on a priority level of the terminal device. Finally, for this embodiment, the location estimate is reported.

In another embodiment, the invention is a computer program that provides a location service in a mobile communication network, so as to provide a location estimate for a terminal device associated with a user. The computer program has a location request module for receiving a location request from a user, a location request processing module that makes a location estimate with an accuracy based on a priority level associated with the user, and a terminal device location estimation reporting module that communicates the location estimate to the user.

In yet another embodiment, the present invention is a system that provides a location service in a mobile communication network. The system has a terminal device in communication with a GMLC, a MSC coupled to the Gateway Mobile Location Center GMLC and a Serving Mobile Location Center SMLC, and is further coupled to a Base Station Controller BSC. In addition, the system has a Location Measurement Unit LMU connected to the BSC, and a location services algorithm distributed in the mobile communications network.

BRIEF DESCRIPTION OF THE DRAWINGS

Other aspects of the invention, including specific embodiments, are understood by reference to the following Detailed Description of a Preferred Embodiment, which should be read in conjunction with the drawings, in which:

FIG. 1 illustrates a mobile communication network that uses a location service;

FIG. 3 is a timing diagram illustrating the flow of information between devices for a specific embodiment of the present invention.

DETAILED DESCRIPTION OF A PREFERRED EMBODIMENT

Figure 2:
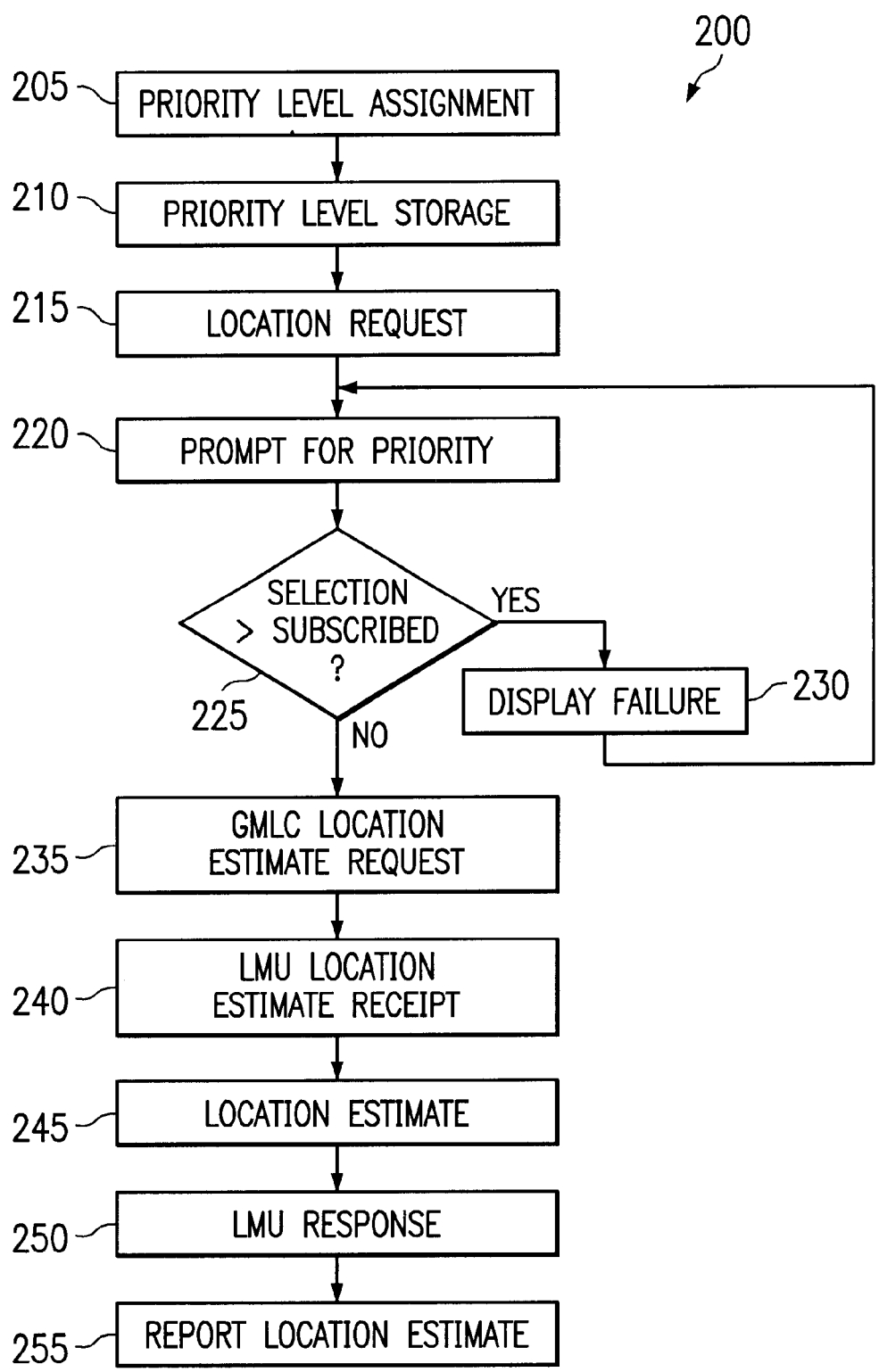
FIG. 2 is a block-flow diagram of a location services algorithm for practicing the present invention.

The present invention allows flexibility in using and allocating mobile communication network resources to estimate the location of a mobile phone, provides additional sources of revenue for mobile communication network operators, and provides a method of corresponding location services to existing services that handle non-location priority, such as eMLPP. The invention is a method, computer program and system that provides a location service in a mobile communications network, where the location service provides a location estimate for a terminal device. The method receives a location request, and, with a precision that is dependent on an assigned priority level, estimates the location of a mobile phone. The computer program implements the method as software, and the system achieves the present invention by applying a location services algorithm to a mobile communications network.

FIG. 2 is a block-flow diagram of a location services (LCS) algorithm 200 for practicing the present invention. First, in a priority level assignment step 205, the LCS algorithm 200 accepts a user selected priority level for a terminal device, which is also known as the subscribed priority level. The priority level the user subscribes to then becomes the highest level of priority to which the user will have access for that terminal device. Next, the subscribed priority level is stored in a priority level storage step 210.

At some point, a user will request the location of the terminal device. The LCS algorithm 200 will receive this request in a location request step 215. If the location request step 215 detects that the user has entered a highest priority request, such as an emergency number (E-911), then the location request step 215 immediately proceeds to determine the location of the terminal device, as illustrated by the emergency services path 217, and proceeds to a GMLC location estimate request step 235. The location request step 215 is implemented in software as a location request module. Next, the LCS algorithm 200 request the user to enter a desired priority level in a prompt for priority step 220. The user will then enter the priority level he wishes to use for the estimating the location of the terminal device.

In the prompt for priority step 220, the user may select as a desired priority level one that is lower than the subscribed priority level. However, the user is prevented from selecting a priority level that is higher than the subscribed priority level. Accordingly, the GMLC will check if the desired priority level is greater than the subscribed priority level. If the desired priority level is lower than or equal to the subscribed priority level, the request will be granted and the LCS algorithm 200 will proceed to the GMLC location estimate request 235. However, if the user, requests a priority that is higher than the subscribed priority, the LCS algorithm 200 proceeds to a display failure step 230 where the user is sent a message indicating that he has requested a priority that is too high, and that requests him to enter another priority level, and returns to the prompt for priority step 220. Alternatively, the display failure step may inform the user of his subscribed priority and use the subscribed priority level as a default priority level, in the event the user does not interact with the device for a predetermined period of time.

In the GMLC location estimate request step 235, a GMLC receives a location estimation request from a user and recognizes that the device being sought is currently in its network. Accordingly, the GMLC then sends a request for location information towards the terminal device, and more specifically, towards the LMUs servicing the terminal device being sought. While the request for a location estimation is being sent towards the LMU, it will be processed. For example, the location estimation request will be examined so that a priority can be assigned to the terminal device being sought. Alternatively, a user requesting the location of a terminal device may have a priority associated with him. In addition, the location priority information may be coupled to other priority information, such as a eMLLP priority, for example. The LMUs servicing the terminal device will receive the request for location information in a LMU location estimate receipt step 240.

Next, the LMUs servicing the terminal device use the priority information generated in the GMLC location estimate request step 235 to estimate the location of the terminal device to a predetermined precision in a location estimate step 245. By predetermined precision it is recognized that more accurate location estimates that deliver higher precision require more processing power and resources than less accurate location estimates that deliver a lower precision. Thus, there is said to be a tradeoff between the precision of the location estimation and processing requirements. After the LMUs estimate the location of the terminal device, the LMUs return the location estimate to the GMLC in a LMU response step 250. Then, in a report location estimate step 255, the GMLC sends the location estimate to the user who requested the location estimate, and the LCS algorithm 200 terminates.

EXAMPLES

EMLPP Priority

One function that uses priority to sort users and provide a radio service to the users is known by the acronym eMLPP. Accordingly, The function of enhanced Multilevel Precedence and Preemption (eMLPP) handles the priority of radio resources only to determine if a user receives access to a radio channel resource. Furthermore, eMLPP priority is handled, and solely acted upon, within the BSS. The table below indicates the levels of priority defined today by GSM eMLPP.

eMLLP Priority Levels

| | |
|---|---|
| −A | (highest subscription) |
| −B | (for subscription) |
| −0 | (for subscription) |
| −1 | (for subscription) |
| −2 | (for subscription) |
| −3 | (for subscription) |
| −4 | (lowest, for subscription) |

The user subscribes to a level of priority depending on how much he is willing to pay for access to a higher priority. However, the user does not have to use the priority to which he subscribes. For example, the user may select an eMLPP level during the call establishment that is lower than the eMLPP level that they are subscribed to incur a lower rate for that eMLPP dependent service. Then, based on the user selected eMLPP level, the system decides upon the values of a Preemption Capability Indicator (for example, PCI=1, a Preemption Vulnerability Indicator (for example, PVI=0), a Queuing Allowed Indictor (for example, QAI=1), and a BSSMAP (for example, 3).

The PCI indicates whether a user can preempt another user, and has two values—if its value is "1" the user can preempt other users, if its value is "0", then the user cannot preempt other users. Similarly, the PVI indicates whether the user can be cut off by another user with a higher priority, and also has two values—if its value is "1" then the user can be preempted by another user, if its value is "0" then the user cannot be preempted by another user. The QAI indicates whether the user will wait in a queue to be served by the service, and also has two values where a "1" indicates that the user will not wait in a queue (faster service) and a "0" indicates that the user will wait in a queue. The BSSMAP allows the network operator to assign network specific priority levels. For example, a subscriber to a level 2 service may in practice be assigned a lower priority than a subscriber with a level 4 service, if the network operator so assigns the BSSMAP priorities.

Priority for the user is then generated based on a Priority Decision Table, such as the Priority Decision Table shown below. The Priority Decision Table is defined in the MSC as exchange data. The PCI, PVI, QAI, and BSSMAP are provided to the BSC during a location estimation request, and the BSC then uses them to allocate radio resources.

EMLPP Priority Decision Table (example)

| EMLPP | PCI | PVI | QAI | BSSMAP Priority |
|---|---|---|---|---|
| A | 1 | 0 | 1 | 3 |
| B | 1 | 1 | 1 | 1 |
| . | . | . | . | . |
| . | . | . | . | . |
| . | . | . | . | . |
| 1 | 1 | 0 | 0 | 2 |

Priority for a Location Service

Priority can be applied to non-teleservices, such as LCS. Furthermore, as services are implemented in the MSC, the MSC can map service specific priority to the eMLLP priority standard discussed above. Accordingly, in the present invention, LCS users are divided into the following categories, and given the corresponding priority values:

Highest priority users (reserved/E-911, FBI)—priority level: A

Home network users (very high priority users)—priority level: B

Other LCS users (high priority foreign users)—priority level: 0

Other LCS clients (including foreign users)—priority level: 1

Other LCS clients (including foreign users)—priority level: 2

Other LCS clients (including foreign users)—priority level: 3

Lowest Priority Users (including foreign users)—priority level: 4

Each client subscribes to a priority level, the subscribed priority level, and this priority level is stored in the GMLC as a maximum priority level. Then, during operation, the user may select a desired priority level that is lower than the subscribed priority level to use to locate a terminal device. The GMLC will check if the desired priority level is greater than the subscribed priority level. If the desired priority level is not greater than the subscribed priority level, the desired priority level will be applied to the request, otherwise the maximum available priority level, the subscribed priority level, will be applied as the priority level.

Accordingly, the priority level is transferred from the GMLC to the MSC with a MAP message called "Provide Subscriber Location." FIG. 3 is a timing diagram illustrating the flow of information between the logical and physical devices that process a LCS request in a specific embodiment of the present invention. As shown, first, the GMLC sends the MSC a "Provide Subscriber Location" message. This message invokes the MSC to implement certain LSC functioning.

When the MAP message "Provide Subscriber Location" is received, the MSC, based on the LCS priority level received in the "Provide Subscriber Location" message, will assign specific values for PCI, PVI, QAI, and SMLC as these values are mapped by the LCS Priority Decision Table (shown below). The LCS Priority Decision Table is defined in the MSC as exchange data.

LCS Priority Decision Table

| LCS Priority | PCI | PVI | QAI | SMLC/LMU Priority |
|---|---|---|---|---|
| A | 1 | 0 | 1 | 3 |
| B | 1 | 1 | 1 | 1 |
| . | . | . | . | . |
| . | . | . | . | . |
| . | . | . | . | . |
| 1 | 1 | 0 | 0 | 2 |

Next, the values of PCI, PVI, QAI and SMLC priority levels will be passed to the SMLC in the MAP message "Provide Location Estimate." In SMLC, the LCS priority information received in the MAP message "Provide Location Estimate" will be used for a number of calculations and functions. For example, the information could be used to make a final position estimate and the accuracy (reliability) of that estimate. In addition, the SMLC could use the information in the overall scheduling of resources required to perform positioning of an MS, in the allocation of LMUs for the purpose of obtaining radio measurements to help locate terminal devices, or in the allocation of a position method to locate a terminal device. Furthermore, highest priority may mean a highest or a lowest accuracy positioning method. Ultimately, the exact influence of LCS priority on the SMLC resources and mobile communication network resources is determined by the actual implementation of the invention, which can be used and exploited as a way vendors offering LCS can distinguish their services from one another. The SMLC then returns these and any other calculations and determinations to the MSC as a DTAP encapsulated MAP message "LCS Information Request", which includes at least the PCI, PVI, QAI, and a priority level.

Next, the MSC maps the priority level to the eMLPP priority level. Afterwards, the MSC performs an Assignment Request towards the BSC. The eMLPP will be used by BSC as discussed above, and may be used for other purposes as well. The BSC will then pass the Assignment Request to the LMU. The received priority information will be used by the LMU to allocate the LMU's available resources, and determine an appropriate accuracy of the measurements. However, as in the SMLC, the exact influence of LCS priority on LMU resources is an implementation issue that can be used as a distinguishing factor between mobile communication network providers.

After the LMU has estimated the location of the terminal device based on the priority level, the location estimation is returned to the GMLC via a return path that passes the location estimation from the LMU to the BSC, then to the MSC and finally on to the GMLC. The GMCL then places the location estimation on a path that leads back to the user that requested the location.

While the invention has been described in conjunction with preferred embodiments, it should be understood that modifications will become apparent to those of ordinary skill in the art and that such modifications are therein to be included within the scope of the invention and the following claims.

We claim:

1. A method that provides a location service in a mobile communications network to provide a location estimate for a terminal device associated with a user, comprising the steps of:

receiving a location request;

associating the user with a subscribed priority level;

prompting the user to enter a desired priority level;

receiving the desired priority level;

determining if the desired priority level exceeds the subscribed priority level;

in response to said determining step processing the location request to determine the location estimate of the terminal device, the precision of the location estimate based on the higher of the desired priority level or the subscribed priority level; and reporting the location estimate.

2. The method of claim 1 further comprising the step of dynamically assigning a subscribed priority level to a terminal device.

3. The method of claim 2 wherein the step of assigning a priority level allows a mobile communication network operator to select the priority level.

4. The method of claim 1 wherein the number of priority levels is seven.

5. The method of claim 1 wherein the step of processing further comprises the steps of:

generating in a Gateway Mobile Location Center (GMLC) a Mobile Application Part (MAP) message that requests the subscriber location from a Mobile Switching Center (MSC);

sending from the MSC to a Serving Mobile Location Center (SMLC) a MAP message that requests a location estimate;

returning from the SMLC to the MSC a location request as a Direct Transfer Application Part (DTAP) encapsulated MAP message; and forwarding the location request to a Location Measuring Unit (LMU) through a Base Station Controller (BSC) as a DTAP message.

6. The method of claim 5 wherein the LMU estimates the location of the terminal device.

7. The method of claim 5 wherein the step of processing further comprises the step of returning from the LMU to the GMLC the location estimate.

8. The method of claim 5 wherein the SMLC allocates mobile communications network resources to estimate the location of the terminal device based on the priority level.

9. The method of claim 1 wherein the step of processing comprises the step of mapping the location service priority level to enhanced Multilevel Precedence Preemption (eMLPP) priority level.

10. The method of claim 1 wherein the priority level is determined by a Location Services (LCS) priority decision table.

11. The method of claim 1 wherein the priority level is dependent on at least a Preemption Capability Indicator (PCI).

12. The method of claim 1 wherein the priority level is dependent on at least a Preemption Vulnerability Indicator (PVI).

13. The method of claim 1 wherein the priority level is dependent on at least a Queing Allowed Indicator (QAI).

14. The method of claim 1 wherein the step of receiving a location request receives a location request from an emergency service.

15. The method of claim 14 further comprising the step of assigning the location request from the emergency service a highest priority level.

16. The method of claim 1 further comprising the step of reserving a highest priority level for emergency service.

17. Machine-readable instructions executable by a computer for providing a location estimate for a terminal device associated with a user in a mobile communications network, said instructions comprising steps for:

receiving a location request;

associating the user with a subscribed priority level;

prompting the user to enter a desired priority level;

receiving the desired priority level;

determining if the desired priority level exceeds the subscribed priority level;

in response to said determining step processing the location request to determine the location estimate of the terminal device, the precision of the location estimate based on the higher of the desired priority level or the subscribed priority level; and reporting the location estimate.

18. The machine-readable instructions of claim 17 wherein the instructions are adapted to allow a mobile communication network operator to select the priority level.

19. The machine-readable instructions of claim 17 wherein the step of processing further comprises the steps of:

generating in a Gateway Mobile Location Center (GMLC) a Mobile Application Part (MAP) message that requests the subscriber location from a Mobile Switching Center (MSC);

sending from the MSC to a Serving Mobile Location Center (SMLC) a MAP message that requests a location estimate;

returning from the SMLC to the MSC a location request as a Direct Transfer Application Part (DTAP) encapsulated MAP message; and forwarding the location request to a Location Measuring Unit (LMU) through a Base Station Controller (BSC) as a DTAP message.

20. The machine-readable instructions executable by a computer of claim 17 wherein the instructions are adapted to further comprise the step of allocating mobile communications network resources to estimate the location of the terminal device based on the priority level.

* * * * *